(12) United States Patent
Raithatha et al.

(10) Patent No.: US 9,928,523 B2
(45) Date of Patent: Mar. 27, 2018

(54) SYSTEM AND METHOD FOR BOOKING AN ADVERTISEMENT TO AN IMPRESSION USING A TARGETING DIMENSION DICTIONARY

(75) Inventors: Vishal Raithatha, Santa Clara, CA (US); Karthikeyan M., Sunnyvale, CA (US); John Pederzolli, Sunnyvale, CA (US)

(73) Assignee: Excalibur IP, LLC, New York, NY (US)

( * ) Notice: Subject to any disclaimer, the term of this patent is extended or adjusted under 35 U.S.C. 154(b) by 515 days.

(21) Appl. No.: 12/965,776

(22) Filed: Dec. 10, 2010

(65) Prior Publication Data
US 2012/0150635 A1    Jun. 14, 2012

(51) Int. Cl.
G06Q 30/00    (2012.01)
G06Q 30/02    (2012.01)

(52) U.S. Cl.
CPC ..... *G06Q 30/0251* (2013.01); *G06Q 30/0241* (2013.01); *G06Q 30/0242* (2013.01); *G06Q 30/0244* (2013.01); *G06Q 30/0269* (2013.01); *G06Q 30/0272* (2013.01); *G06Q 30/0276* (2013.01); *G06Q 30/0277* (2013.01)

(58) Field of Classification Search
CPC ........... G06Q 30/0277; G06Q 30/0251; G06Q 30/0241; G06Q 30/0242; G06Q 30/0244; G06Q 30/0269; G06Q 30/0272; G06Q 30/0276
USPC ........... 705/14.4, 14.41, 14.43, 14.49, 14.66, 705/14.68, 14.72, 14.73
See application file for complete search history.

(56) References Cited

U.S. PATENT DOCUMENTS

| | | | | |
|---|---|---|---|---|
| 6,327,574 | B1 * | 12/2001 | Kramer | ............. G06F 17/30893 |
| | | | | 705/14.66 |
| 7,587,412 | B2 * | 9/2009 | Weyl et al. | |
| 7,630,986 | B1 * | 12/2009 | Herz et al. | |
| 8,185,096 | B2 * | 5/2012 | Smith et al. | ............... 455/414.1 |
| 8,190,601 | B2 * | 5/2012 | Ahari et al. | .................. 707/722 |
| 8,280,827 | B2 * | 10/2012 | Muller et al. | .................... 706/11 |
| 8,666,812 | B1 * | 3/2014 | Gandhi | ............. G06Q 30/0255 |
| | | | | 705/14.52 |
| 2003/0083937 | A1 * | 5/2003 | Hasegawa | .......... G06Q 30/0253 |
| | | | | 705/14.53 |
| 2007/0067297 | A1 * | 3/2007 | Kublickis | ........................ 707/9 |

(Continued)

*Primary Examiner* — Raquel Alvarez
(74) *Attorney, Agent, or Firm* — Brinks Gilson & Lione

(57) ABSTRACT

A system and method for booking targeted internet advertisements to web page impressions using a targeting dimension dictionary. The method commences by constructing a targeting dimension dictionary using a dictionary schema such as an XML DTD or other schema language, then retrieving the targeting dimension dictionary to book the impression using a target predicate wherein the target predicate is constructed at least in part using the targeting dimension dictionary. Such target predicates are used to match (i.e. satisfying the target predicate) an advertisement to the impression. The targeting dimension dictionary comprises a targeting dimension object, a targeting dimension attribute type object, and an application attribute type object. Dimension attribute type objects can include a segment definition for codifying sets or ranges of values. Such a targeting dimension dictionary can be accessed by various tools used in internet advertising campaigns for targeting based on predicates.

14 Claims, 13 Drawing Sheets

(56) References Cited

U.S. PATENT DOCUMENTS

| | | | |
|---|---|---|---|
| 2007/0233513 A1* | 10/2007 | Lapstun et al. | 705/1 |
| 2008/0140524 A1* | 6/2008 | Anand | G06Q 30/02 705/14.66 |
| 2008/0155588 A1* | 6/2008 | Roberts | G06Q 30/00 725/34 |
| 2009/0132346 A1* | 5/2009 | Duggal | G06Q 30/02 705/7.33 |
| 2011/0043652 A1* | 2/2011 | King et al. | 348/222.1 |

* cited by examiner

Create a Contract for an Advertising Campaign in 6 Simple Steps

Please note that this signup process uses image verification technology to prevent abuse. Screen readers are not compatible with this technology. In an effort to serve as many Yahoo! customers as possible, we also offer phone registration. If you are using a screen reader, please call us at 1-800-123-4567 to register for a Search Marketing account. We look forward to partnering with you.

1A10 — [1] Tell Us About Your Products or Services
Enter information about what you want to advertise.

1A15: Type the URLs to your webpages or catalog pages. For example: http://myProductPages.com/Product_A 1A20 — [2] Target Customers by Geographic Location and Internet Properties
Display your ad to customers throughout the entire market, or select specific regions or cities.

1A30 — [3] Choose Target Markets Using Predicates Related to Your Business
Use menus and easy-to-use screen widgets to define your targets.

1A40 — [4] Tell Us How Much You'd Like to Spend
Specify your daily spending limit and maximum bid.

1A50 — [5] Create Your Ad for Placements
Write the ad that will be displayed to prospective customers.

1A60 — [6] Activate or Save Your Contract Within Your Campaign
Review your ad and activate it by entering your billing information, or save it until you are ready to activate.

| History of Hits (January 2007 actual) | Number of Visitors ($P_0$) | From New York ($P_1$) | From California ($P_2$) | Male ($P_3$) |
|---|---|---|---|---|
| EmpireState.com | 10,000 | 5,000 | 5,000 | 5,300 |
| EmpireState.com/hotels | 9,000 | 8,000 | — | 4,000 |

FIG. 2A

SYSTEM AND METHOD FOR BOOKING AN ADVERTISEMENT TO AN IMPRESSION USING A TARGETING DIMENSION DICTIONARY

FIELD OF THE INVENTION

The present invention is directed towards placement of internet advertising, and more particularly towards booking an advertisement to an impression using a targeting dimension dictionary extensible to new attribute types.

BACKGROUND OF THE INVENTION

The marketing of products and services online over the internet through advertisements is big business. Advertising over the internet seeks to reach individuals within a target set having very specific demographics (e.g. male, age 40-48, graduate of Stanford, living in California or New York, etc). This targeting of very specific demographics is in significant contrast to print and television advertisement that is generally capable only to reach an audience within some broad, general demographics (e.g. living in the vicinity of Los Angeles, or living in the vicinity of New York City, etc). The single appearance of an advertisement on a web page is known as an online advertisement impression. Each time a web page is requested by a user via the internet represents a placement opportunity to display an advertisement in some portion of the web page to the individual internet user.

Some advertisers enter into contracts with an ad serving company (or publisher) to receive placements of their advertisements or messages in impressions. An advertiser may specify desired targeting criteria. For example, an advertiser may enter into a guaranteed delivery contract with the ad serving company, and the ad serving company may agree to place 2,000,000 impressions over thirty days for US$15,000. In some cases, an advertiser will choose to enter into a non-guaranteed contract with the ad server company and only pay for those impressions actually made by the ad serving company on their behalf. Of course, in modern internet advertising systems, the competition among advertisers for placement of impressions under non-guaranteed contracts is often resolved by an auction, and the winning bidder's advertisements are shown in the available spaces of the impression.

Online advertising and marketing campaigns often rely, at least partially, on a process where any number of advertisers book contracts with the intention to reach users who satisfy some particular targeting criteria (e.g. male, age 40-48, graduate of Stanford, living in California or New York, etc). Matching a contract to a user and any placements of advertisements based on the matching can be thought of as a market function, where a user visit is a unit of supply, and a contract is a unit of demand. The market is served by booking demand to supply. The booking of demand to supply applies to contextual advertising (e.g. text and graphical ads that match a page context and user impression) as well as to sponsored search advertising (e.g. ads that match with search engine queries and results). Various degrees of matching may occur when a user's attribute is matched against an advertiser's targeting criteria.

Considering that (1) the actual existence of a web page placement opportunity suited for displaying an advertisement is not known until the user clicks on a link pointing to the subject web page, and (2) that the matching process for selecting advertisements must complete before the web page is actually displayed, it then becomes clear that the process of assembling competing booked contracts, completing the matching, and compositing the web page with the advertiser's ads must start and complete within a matter of fractions of a second. Thus, advertising systems are designed to rapidly match advertisements to impressions. Additionally, in legacy advertising systems, such matching uses predetermined criteria. For example, a legacy system might use an inverted index that has been constructed using predetermined criteria such as GENDER and AGE such that a targeting predicate (e.g. GENDER="male" AND AGE="40-48", etc) can be used with the inverted index to retrieve one or more advertisements for display to an internet user who is, for example, male and age 43.

The exploding popularity and sophistication of the internet has brought to bear easy access for anyone or any entity to publish, consume and aggregate content. Along with an explosion of content, the rate of appearance of advertisements that accompany content (which advertisements also serve to monetize the content) is growing at a similar pace. Internet advertising systems need to support a large and sophisticated ecosystem of participants including publishers, content providers, ad networks, ad agencies, ad aggregators, ad arbitragers, social networking website operators, etc, for targeting specific demographics. Accordingly, new targeting criteria are introduced frequently. Advertisers change (e.g. more narrowly define) their target markets, and the legacy technique for constructing an inverted index using predetermined criteria needs to be improved such that the construction of the inverted index (and other operations) is based on a flexible schema definition having the capability of frequently and dynamically addressing new targeting criteria (e.g. for addressing target markets having new targeting dimensions, new dimension attribute types, and new dimension attribute values).

Thus, techniques are needed for booking an advertisement to an impression using dynamically-created target market criteria (e.g. using a dynamically-updated target dictionary extensible to new attribute type declarations and the number of values against each attribute type). Also, the tools used by advertisers can be advantageously improved by implementing a generic approach (e.g. using a dynamically-updated target dictionary) that allows introducing new attribute types and values without explicit predetermination and without undue engineering effort, while keeping the advertising system scalable.

Other automated features and advantages of the present invention will be apparent from the accompanying drawings and from the detailed description that follows below.

SUMMARY OF THE INVENTION

A system and method for booking targeted internet advertisements to web page impressions using a targeting dimension dictionary that is extensible to new attribute type declarations. The method commences by constructing a targeting dimension dictionary using a dictionary schema such as an XML DTD or other schema language, then retrieving a set of advertisements matching the impression using a target predicate wherein the target predicate is constructed at least in part using the targeting dimension dictionary. Once such a matched, targeted (i.e. satisfying the target predicate) advertisement has been retrieved, the method then displays the matched advertisement in the impression. The targeting dimension dictionary comprises a targeting dimension object, a targeting dimension attribute type object, and an application attribute type object. Dimension attribute type objects can include a segment definition for codifying sets or ranges of values. Such a targeting dimension dictionary can be accessed by various tools used in internet advertising campaigns for targeting based on predicates.

BRIEF DESCRIPTION OF THE DRAWINGS

The novel features of the invention are set forth in the appended claims. However, for purpose of explanation, several embodiments of the invention are set forth in the following figures.

FIG. 1A shows a screen device with a multi-step procedure for defining and managing variables within an advertising campaign in which some embodiments operate.

FIG. 2A is a depiction of a table of inventory that can be constructed showing a variety of demographic targeting dimensions, which demographic targeting dimensions can be defined by one or more predicates, according to one embodiment.

DETAILED DESCRIPTION

Figure 1B:
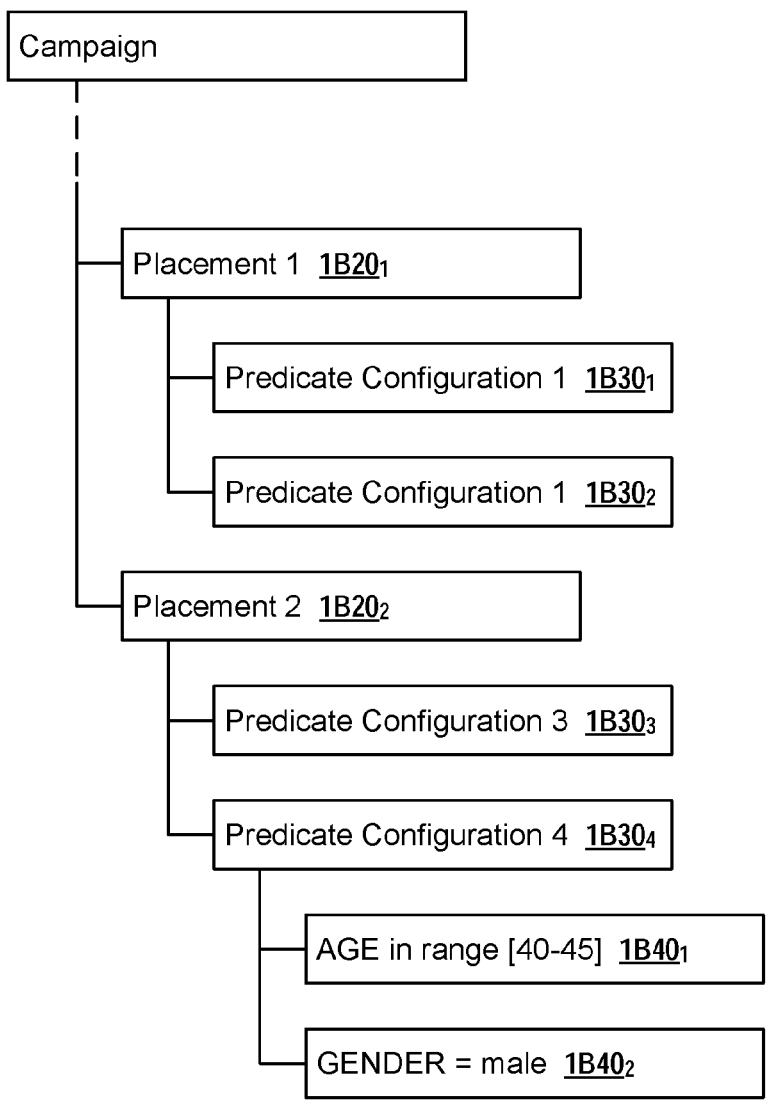
FIG. 1B is a depiction of an exemplary hierarchical relationship between a campaign, contracts, placements, predicate configurations, and target predicates, according to one embodiment.

In the following description, numerous details are set forth for purpose of explanation. However, one of ordinary skill in the art will realize that the invention may be practiced without the use of these specific details. In other instances, well-known structures and devices are shown in block diagram form in order to not obscure the description of the invention with unnecessary detail.

Definitions

Some of the terms used in this description are defined below (in alphabetical order) for easy reference. These terms are not rigidly restricted to these definitions. A term may be further defined by the term's use in other sections of this description.

"Ad" (e.g. ad, item and/or message) means a paid announcement, as of goods or services for sale, preferably on a network such as the internet. An ad may also be referred to as an item and/or a message.

"Ad call" means a message sent by a computer to an ad server for requesting an ad to be displayed.

"Ad click-through rate" (e.g. click-through rate) means a measurement of ad clicks per a period of time.

"Ad code" means the HTML or other markup language description that describes an advertisement or message in such a manner as can be parsed by a browser. Ad code may include references to other ad code. Ad code may mean any subset, or portion or segment of ad code that describes an advertisement or message in such a manner as can be parsed by a browser.

"Ad server" is a server that is configured for serving one or more ads to user devices. An ad server is preferably controlled by a publisher of a website and/or an advertiser of online ads. A server is defined below.

"Advertiser" (e.g. messenger and/or messaging customer, etc) means an entity that is in the business of marketing a product and/or a service to users. An advertiser may include, without limitation, a seller and/or a third-party agent for the seller. An advertiser may also be referred to as a messenger and/or a messaging customer. Advertising may also be referred to as messaging.

"Advertising" means marketing a product and/or service to one or more potential consumers by using an advertisement. One example of advertising is publishing a sponsored search ad on a website.

"Application server" is a server that is configured for running one or more devices loaded on the application server. For example, an application server may run a device configured for deducing shadow profiles.

"Click" (e.g. ad click) means a selection of an ad impression by using a selection device such as, for example, a computer mouse or a touch-sensitive display.

"Client" means the client part of a client-server architecture. A client is typically a user device and/or an application that runs on a user device. A client typically relies on a server to perform some operations. For example, an email client is an application that enables a user to send and receive email via an email server. In this example, the computer running such an email client may also be referred to as a client.

"Conversion" (e.g. ad conversion) means a purchase of a product/service that happens as a result of a user responding to an ad and/or a coupon.

"Coupon" (e.g. coupon ad) means a portion of a certificate, ticket, label, ad or the like—set off from the main body by dotted lines or the like to emphasize its separability—entitling the holder to something, such as a gift or discount, or for use as an order blank or a contest entry form, etc. A coupon is designed in a convenient format for a user to "take" the coupon to a seller to receive an advertised benefit.

"Database" (e.g. database system, etc) means a collection of data organized in such a way that a computer program may quickly select desired pieces of the data. A database is an electronic filing system. In some instances, the term "database" is used as shorthand for a "database management system". A database may be implemented as any type of data storage structure capable of providing for the retrieval and storage of a variety of data types. For instance, a database may comprise one or more accessible memory structures such as a CD-ROM, tape, digital storage library, flash drive, floppy disk, optical disk, magnetic-optical disk, erasable programmable read-only memory (EPROM), random access memory (RAM), magnetic or optical cards, etc.

"Device" means hardware, software or a combination thereof. A device may sometimes be referred to as an apparatus. Examples of a device include, without limitation, a software application such as Microsoft Word™ or a database; or hardware such as a laptop computer, a server, a display; or a computer mouse and/or a hard disk.

"Impression" (e.g. ad impression) means a delivery of an ad to a user device for viewing by a user.

"Item" means an ad, which is defined above.

"Marketplace" means a world of commercial activity where products and/or services are browsed, bought and/or sold, etc. A marketplace may be located over a network, such as the internet. A marketplace may also be located in a physical environment, such as a shopping mall.

"Message" means an ad, which is defined above.

"Messaging" means advertising, which is defined above.

"Messenger" means an advertiser, which is defined above.

"Network" means a connection, between any two or more computers, that permits the transmission of data. A network may be any combination of networks including, without limitation, the internet, a local area network, a wide area network, a wireless network, and/or a cellular network.

"Placement" (e.g. ad placement) means a delivery of an ad to a user device for viewing by a user.

"Publisher" means an entity that publishes, on a network, a web page having content and/or ads, etc.

"Server" means a software application that provides services to other computer programs (and their users) on the same computer or on another computer or computers. A server may also refer to the physical computer that has been set aside to run a specific server application. For example, when the software Apache HTTP Server is used as the web server for a company's website, the computer running Apache may also be called the web server. Server applications may be divided among server computers over an extreme range, depending upon the workload.

"Social network" or "social networking website" means a networked software application having user accounts (e.g. nodes) that are coupled by using one or more interdependencies such as, for example, friendship, kinship, common interest, financial exchange, dislike, sexual relationship, beliefs, knowledge and/or prestige. Examples of a social network include, without limitation, Facebook™, Twitter™, Myspace™, Delicious™, Digg™, and/or Stumble Upon™

"Software" means a computer program that is written in a programming language that may be used by one of ordinary skill in the art. The programming language chosen should be compatible with the computer on which the software application is to be executed and, in particular, with the operating system of that computer. Examples of suitable programming languages include, without limitation, Object Pascal, C, C++ and/or Java. Further, the functions of some embodiments, when described as a series of steps for a method, could be implemented as a series of software instructions for being operated by a processor such that the embodiments could be implemented as software, hardware, or a combination thereof. Computer-readable media are discussed in more detail in a separate section below.

"System" means a device or multiple coupled devices. A device is defined above.

"User" (e.g. consumer, etc) means an operator of a user device. A user is typically a person who seeks to acquire a product and/or service. For example, a user may be a woman who is browsing Yahoo!™ Shopping for a new cell phone to replace her current cell phone. The term "user" may also refer to a user device, depending on the context.

"User device" (e.g. computer, user computer, client and/or server, etc) means a single computer or a network of interacting computers. A user device is a computer that a user may use to communicate with other devices over a network, such as the internet. A user device is a combination of a hardware system, a software operating system, and perhaps one or more software application programs. Examples of a user device include, without limitation, a laptop computer, a palmtop computer, a smart phone, a cell phone, a mobile phone, an IBM-type personal computer (PC) having an operating system such as Microsoft Windows™, an Apple™ computer having an operating system such as MAC-OS, hardware having a JAVA-OS operating system, and/or a Sun Microsystems™ workstation having a UNIX operating system.

"Web browser" means a software program that may display text or graphics or both, from web pages on websites. Examples of a web browser include, without limitation, Mozilla Firefox™ and Microsoft internet Explorer™.

"Web page" means documents written in a mark-up language including, without limitation, HTML (hypertext mark-up language), VRML (virtual reality modeling language), dynamic HTML, XML (extensible mark-up language), and/or other related computer languages. A web page may also refer to a collection of such documents reachable through one specific internet address and/or through one specific website. A web page may also refer to any document obtainable through a particular URL (uniform resource locator).

"Web portal" (e.g. public portal) means a website or service that offers a broad array of resources and services such as, for example, email, forums, search engines, and online shopping malls. The first web portals were online services, such as AOL, that provided access to the web. However, now, most of the traditional search engines (e.g. Yahoo!™) have transformed themselves into web portals to attract and keep a larger audience.

"Web server" is a server configured for serving at least one web page to a web browser. An example of a web server is a Yahoo!™ web server. A server is defined above.

"Website" means one or more web pages. A website preferably includes a plurality of web pages virtually connected by links or URL addresses to form a coherent group.

Role of Campaigns in Online Advertising

Online advertising and marketing campaigns often rely at least partially on a process where advertisers prosecute advertising campaigns according to some objective (e.g. reach to audiences, return on advertising spend, etc). In the context of online advertising, a campaign may be defined with the aid of tools. For example, the definition of an online advertising campaign can be computer-aided, whereby a series of screen devices within a web page serves to define variables within an advertising campaign (e.g. based on advertiser input). Certain variables in such a campaign can be refined to include highly-specific target marketing segments. For example, an advertiser can book contracts with the intention to reach users who satisfy some particular targeting criteria (e.g. male, age 40-48, graduate of Stanford, living in California or New York, etc).

FIG. 1A depicts a screen device 1A00 with a multi-step procedure for defining and managing variables within an advertising campaign. As shown, the steps for defining variables within an ad campaign might include providing some initial information about the products or services to be advertised (see step 1A10) and/or establishing geographic coverage and/or specific internet properties (see step 1A20). For example, definition of a property can comprise the advertiser's intention to place ads at a particular internet website (e.g. at Yahoo.com, ESPN.com, etc). Defining variables within an ad campaign might further include defining specific target markets by defining predicates that seek to cover the intended target market (see step 1A30), defining advertising spend- and budget-oriented constraints 1A40, creating advertising copy and advertising imagery 1A50, and activating and/or saving the campaign variables (see step 1A60). In various embodiments, one or more of the steps 1A10-1A60 might be performed on the basis of user interaction from a client system (e.g. a terminal). In some embodiments, one or more of the steps 1A10-1A60 might be performed either fully automatically, or in a computer-aided manner by use of an application server. In an exemplary embodiment, the step 1A10 for providing some initial information about the products or services to be advertised by including a text block screen device 1A15 for requesting a user to merely identify a web page that features the products or services to be advertised. Of course a wide range of information about the subject product or service might be found at the identified web page(s), including information supporting definition of some of the campaign variables discussed.

As can now be understood, an exemplary advertising campaign may comprise one or more contracts, and a contract may comprise one or more placements, and a placement may in turn associate with any number of predicate configurations.

FIG. 1B depicts an exemplary hierarchical relationship between a campaign, contracts, placements, predicate configurations, and target predicates. As shown, a campaign 1B00 can comprise one or more contracts (not shown), which in turn may comprise one or more placements 1B20 (i.e. a subcontract). And, a placement can comprise a target predicate 1B40 or a plurality of target predicates, which may be variously amalgamated into any number of the aforementioned predicate configurations 1B30.

In order for a contract for delivery of one or more placements to be satisfied, there should exist specific inventory to be delivered under the terms of the contract. More specifically, there should exist specific inventory to be delivered that satisfies the predicate configuration. In the example of FIG. 1B, the predicate configuration 4 1B30$_4$ comprises two predicates, namely a predicate for AGE 1B40$_1$, and a predicate for GENDER 1B40$_2$. In the case of online internet advertising, an item of inventory (e.g. an impression) might be specified in an arbitrarily complex description that might involve dozens, or hundreds, or even more predicates. Moreover, a particular predicate might specify a targeting dimension (e.g. AGE) as well as dimension attributes (e.g. age range) and values (e.g. [40-45]), which attributes and values are to be matched to one or more matching contracts for placement of advertisements.

As shown in FIG. 2A, a table of inventory 2A10 can be constructed showing a variety of demographic targeting dimensions, which demographic targeting dimensions can be defined by one or more predicates. For example, a history of hits at a particular property might indicate how many hits occurred in a particular month (e.g. January 2007) at a particular page (e.g. website "empirestate.com" had 10,000 visitors) or sub-page (e.g. "empirestate.com/hotels" had 9,000 visitors). And to the extent that any particular demographics can be captured (e.g. visitors from New York, visitors from California, male visitors, visitors in the age range [40-45], etc), those counts might also be captured and used in predicting inventory for an upcoming time period. As shown, FIG. 2A depicts page hits for just one month (e.g. January, 2007), however any number of time periods might be represented in a three-dimensional table.

Figure 2B:
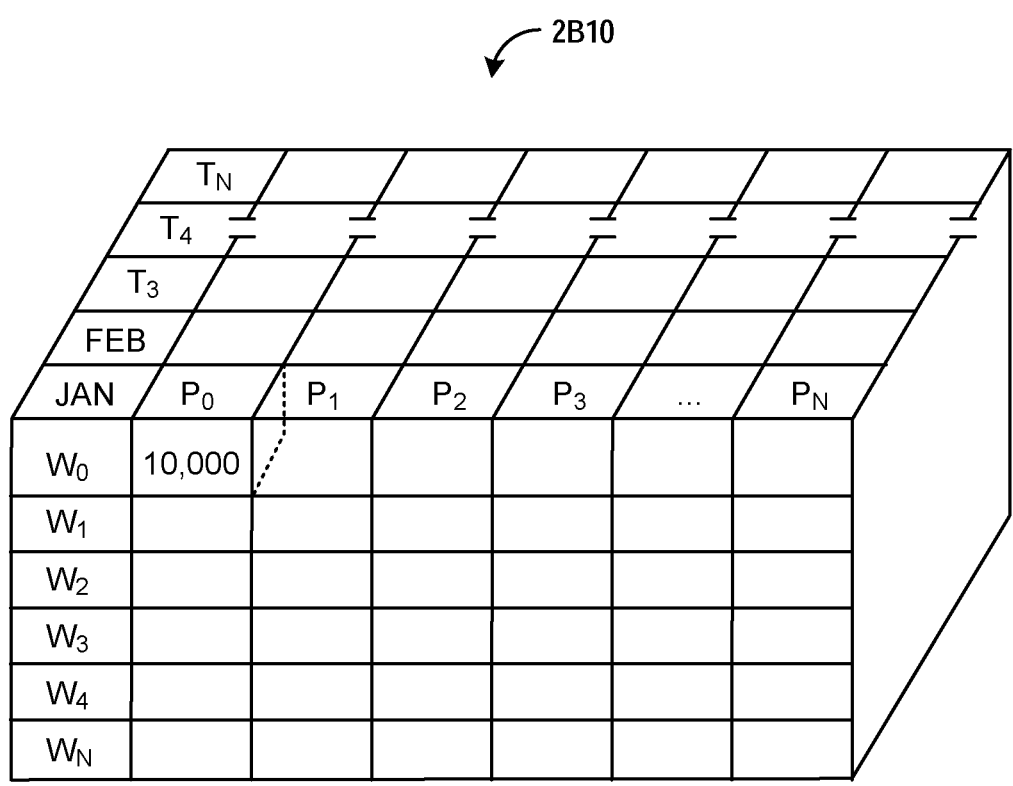
FIG. 2B is a depiction of a three-dimensional table showing dimensions of a web page, a time period, and some selection of demographic properties, according to one embodiment.

FIG. 2B depicts a three-dimensional table 2B10 showing dimensions of various web pages (e.g. $W_0$, $W_1$, $W_2$, $W_n$), over a time period (e.g. $T_0$, $T_1$, $T_2$, $T_n$), with respect to some selection of demographic properties (e.g. $P_0$, $P_1$, $P_2$, $P_n$). As shown, there were 10,000 hits in January at web page $W_0$ corresponding to the property $P_0$. In the context of demographics available for various populations, FIG. 2B is an example in only three dimensions. Typically, many more dimensions are available, and might be represented in an N-space array (i.e. high-dimensional space). Of course any M-dimensional array where M is greater than three is difficult to show on paper. However alternative representations such as an M-dimensional array (where M is any positive integer) and methods for identifying sets of points (e.g. showing conjoint or disjoint sets) or lists of attribute/value pairs (e.g. {state, California}, {gender, male}, {age, 45}, {weight, 165}) might be used to represent points in M-dimensional space. In alternative representations, the conjoint might be written as lists of desired matches (e.g. state=California, gender=male, age=45, weight=165).

Continuing with the discussion of FIG. 2B, properties of a web page might be expressed such that a targeting expression (e.g. an expression involving one or more targeting dimensions) might cover multiple attribute values of the corresponding attribute or property (e.g. $P_0$="Value1", $P_0$="Value2"), with an attribute value corresponding to a particular value taken on by the property $P_0$. A single logic expression (e.g. {(page=$W_0$) AND (month=JAN) AND ($P_0$=V1 OR $P_0$=V2)}) can thus be used to describe multiple points in an M-dimensional space. As shown, there exists an inventory of 10,000 units that satisfy the preceding expression, 6,000 units where $P_0$=V1, plus another 4,000 units where $P_0$=V2. Further, an advertiser might seek a segment of a target market that is not fully covered by a simple value/attribute pair. That is, an attribute value pair expressed as {state, California} might be more specific than desired by an advertiser based on the border of California and Arizona. Accordingly, a broader segment might be codified by a predicate using a multi-valued attribute, such as {state IN {California, Arizona}}, meaning a match if the attribute value for the targeting attribute state is found in a set comprising the values of California and Arizona Of course the concept of delivery of a placement of an advertisement to a particular internet user—based on a particular predicate involving a targeting dimension, a dimension attribute type, and an predicate involving one or more dimension attribute values—can be implemented in an advertising server network. In fact, and as is disclosed herein, such an advertising server network can be configured to match an advertisement to an impression using either or both predetermined target market criteria or dynamically-created target market criteria.

Overview of Networked Systems for Online Advertising

Figure 3:
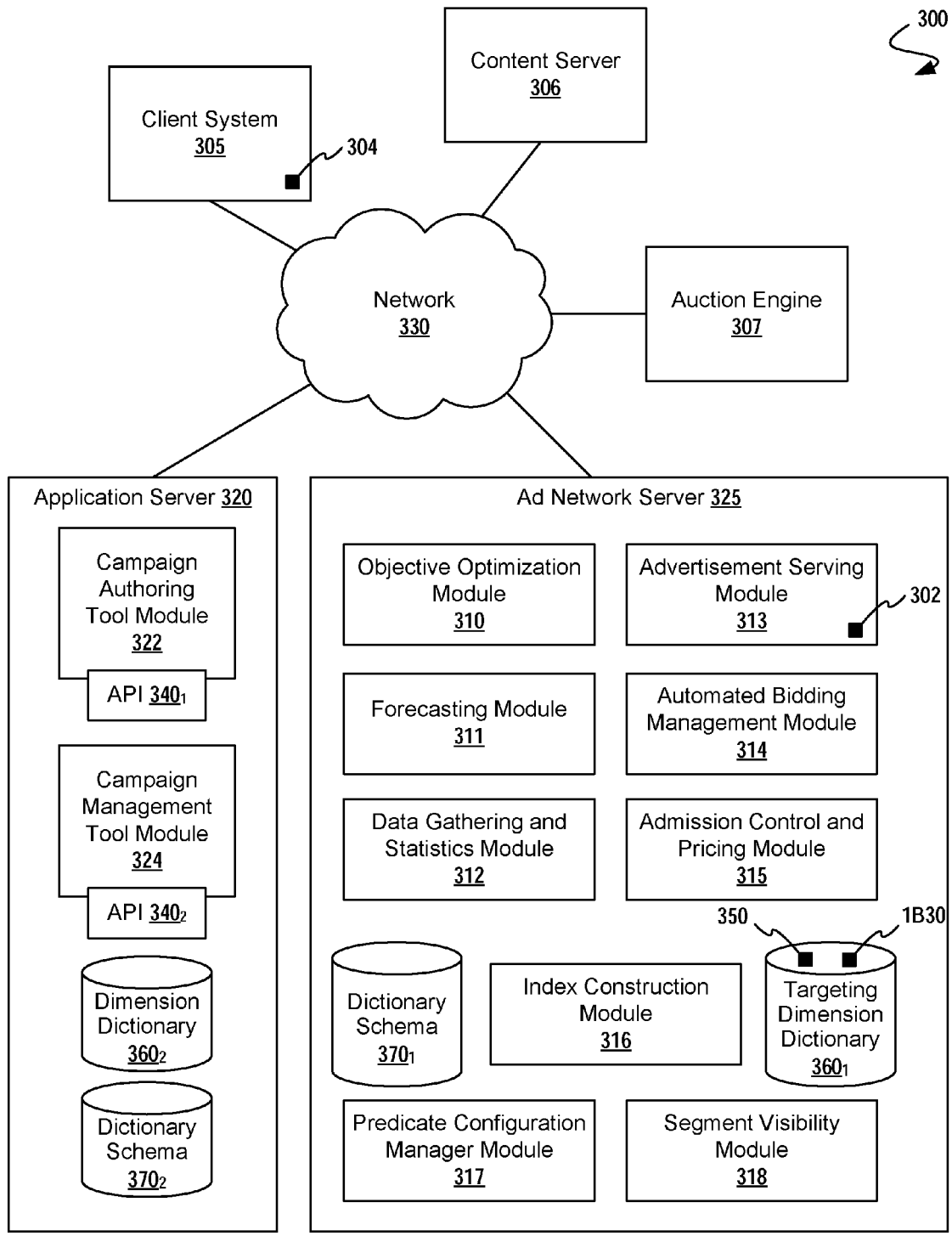
FIG. 3 is a depiction of an advertising server network including modules for matching an advertisement to an impression using target market criteria, according to one embodiment.

FIG. 3 depicts an advertising server system 300 including modules for booking an advertisement to an impression using target market criteria. An internet advertiser may select a particular internet property (e.g. the landing page for the Empire State, empirestate.com) and may create one or more advertisements 302 such that whenever any internet user, via a client system 305, renders the web page from the content server 306, the advertisement is composited on a web page by an ad network server 325 for delivery of an impression 304 to a client system 305 over a network 330.

This delivery model, as just described, does not take into account any explicit demographics of the internet user, nor does it take into account any explicit demographics sought by the internet advertiser.

As is known in the art, an internet user might be described (e.g. using a cookie or user profile) as pertains to a wide range of characteristics (e.g. demographics, targeting dimensions, dimension values, segments, etc). Therefore, advertisers can define targeted campaigns (e.g. see FIG. 1) and, in the case of multiple competing advertisers (i.e. competing for placement of an advertisement to a particular user) might elect to bid in a market (e.g. an exchange) via an exchange server or auction engine 307 in order to win the most prominent spot. Or an advertiser might enter into a contract (e.g. with the internet property, or with an advertising agency, or with an advertising network, etc) to purchase the desired spots for some time duration (e.g. all top spots in all impressions of the web page empirestate.com/hotels for all of 2010).

In embodiments of the system 300, components of the ad network server can perform processing such that, given an ad opportunity (e.g. a placement opportunity), processing determines which (if any) contracts match the placement opportunity.

In some embodiments, the system 300 might host a variety of modules to serve management and control operations (e.g. an objective optimization module 310, a forecasting module 311, a data gathering and statistics module 312, an advertisement serving module 313, an automated bidding management module 314, an admission control and pricing module 315, an index construction module 316, a predicate configuration manager module 317, and a segment visibility module 318, etc) pertinent to contract matching and delivery methods. In particular, the modules, network links, algorithms and data structures embodied within the system 300 might be specialized so as to perform a particular function or group of functions reliably while observing capacity and performance requirements. For example, an application server 320 in conjunction with an ad network server 325 might be configured to host campaign authoring tools (e.g. a campaign authoring tool module 322, a campaign management tool module 324, a forecasting module 311 etc). Also, an index construction module 316 might be configured to construct an index based on a targeting dimension dictionary using a dictionary schema. In some embodiments, an index construction module 316 can also serve for constructing a targeting dimension dictionary 360. However other modules can also serve for constructing a targeting dimension dictionary 360, including an offline process, or an online process, or both. A targeting dimension dictionary $360_1$ can be hosted within an ad network server 325, or a targeting dimension dictionary $360_2$ can be hosted within an application server 320. Similarly, a dictionary schema $370_1$ can be hosted within an ad network server 325, or a dictionary schema $370_2$ can be hosted within an application server 320.

In exemplary embodiments, a targeting dimension dictionary 360 includes a targeting dimension 350. Similarly, in some embodiments, a targeting dimension dictionary 360 can include any number of instances of a predicate configuration 1B30, or a given predicate configuration 1B30 amalgamating any number of predicates. The targeting dimension dictionary can include a targeting dimension object, a targeting dimension attribute type object, and an application attribute type object, which objects are further disclosed herein. The targeting dimension object represents a computer readable object used for storing aspects of a targeting dimension. The dimension attribute type object represents a computer readable object used for storing aspects of a dimension attribute type. The application attribute type object represents a computer readable object used for storing aspects of a dimension application attribute type.

As shown in FIG. 3, and as is further discussed below (see FIG. 5), campaign applications (e.g. campaign authoring tool module 322, campaign management tool module 324, etc) can be configured to include an application programming interface 340.

Now, discussing the matching techniques more formally, given an internet advertising opportunity (e.g. a placement opportunity) specified as a predicate or Boolean expression (e.g. a vector, a list, a set of attributes each of which may have one or more associated values, etc) and including assignments of one or more attributes to one or more values, find all of the contracts that could satisfy this opportunity. For example, given the placement opportunity profile predicate {(state=CA) AND (gender=male) AND (age=50)}, some possibly matching contracts would include those asking for {(gender=male) AND (state=CA)}, and would include those asking for {(gender=male) AND {(age=50)} because each clause of each of those contracts are satisfied against the example placement opportunity profile predicate. Embodiments permit both disjunctive as well as conjunctive types of contracts—and even contracts including more complex predicates—to be handled efficiently. As regards contracts including complex predicates, embodiments support a wide range of Boolean operators including "IN" operators (e.g. state IN (NY, CA, MA)) and "NOT-IN" operators (e.g. state NOT-IN (NY, CA, MA)), as well as confidence operators (e.g. gender="male" {confidence>30%}).

Figure 4:
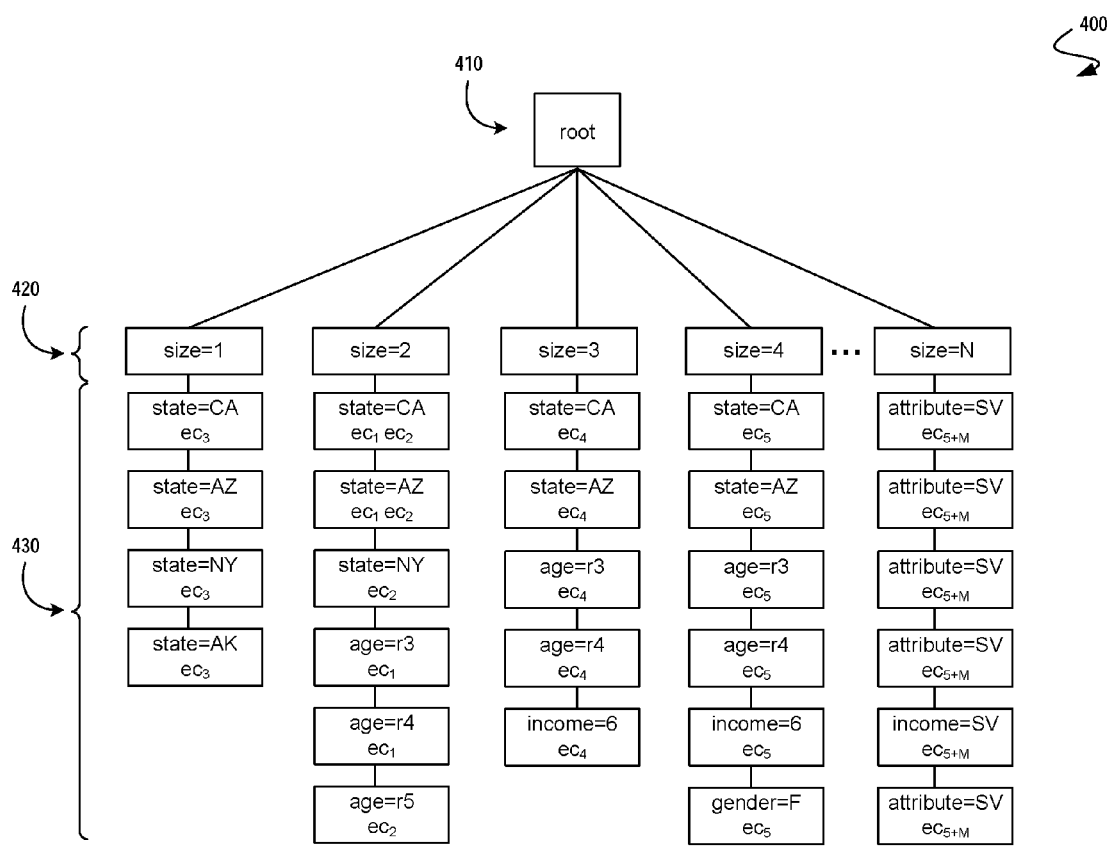
FIG. 4 is a depiction of a hierarchical representation of an inverted index, according to one embodiment.

FIG. 4 is a hierarchical representation of an inverted index 400. The index is constructed for returning contracts (e.g. identified as $ec_1$, $ec_2$, $ec_3$, etc), based on a matching placement opportunity predicate. The inverted index 400 includes a root 410, and also contains nodes corresponding to the size of contracts as measured by number of conjunctions (see the conjunct hierarchical level 420). Under each value for size (e.g. size=1, size=2, size=3, . . . ) are the predicates of the conjunctions, together with a list of contracts that satisfy that placement opportunity predicate (see contract identifiers $ec_1$, $ec_2$, $ec_3$, etc at hierarchical level 430).

An index construction module can manage adding contracts to an existing index. Or an index construction module can manage adding new targeting dimensions to an existing index. Of course, although such a newly-constructed index (i.e. with new targeting dimensions) can be constructed, that aspect of the index or, for that matter, any aspects pertaining to newly added targeting dimensions, is not intended to be used for matching until such time as there exists an advertising campaign that specifies some use of the newly added targeting dimensions. In legacy systems, the applications (e.g. campaign authoring tools, campaign management tools) were only able to comprehend predetermined criteria. New criteria (e.g. for addressing target markets having new targeting dimensions, new dimension attribute types, and new dimension attribute values) may not have been comprehended by the application.

Thus, to overcome such limitations of legacy systems, various embodiments of systems for booking an advertisement to an impression use a targeting dimension dictionary include a flexible schema definition (e.g. a dictionary schema) for providing the capability of dynamically adding new targeting dimensions, new dimension attribute types, and new dimension attributes. Further, a targeting dimension dictionary is provided in combination with an application programming interface (API) for use by different applications (e.g. campaign authoring tool module 322, campaign management tool module 324, etc).

Overview of a Targeting Dimension Dictionary for Online Advertising

The systems described herein for booking an advertisement to an impression using a targeting dimension dictionary provides a scalable targeting infrastructure for applications with similar requirements for interfacing to and with a targeting dimension dictionary. Aspects of the scalable targeting infrastructure include an application programming interface, a set of rules, a schema, etc, which aspects provide single source (e.g. the targeting dimension dictionary, through the application program interface) of dimension data. Such techniques support dynamic addition of new targeting dimensions that can be added without modifying the application. And, such techniques can provide for consistent storage and retrieval of targeting dimension data that flow across the system, thus avoiding mismatches between differing applications. Moreover, use of the targeting dimension dictionary, through the application program interface, avoids duplication of code (and engineering effort) for providing the same behavior in different applications.

Dimension-oriented characteristics can be organized into relationships as follows:

Targeting Dimensions: Targeting dimensions create the high-level bucket or grouping for the different attribute types that the system can support. Each targeting dimension can hold one or more attribute types that belong to a common category and can be grouped together as a targeting dimension.

Dimension Attribute Types: Dimension Attribute types define attributes for a given dimension.
  Each dimension attribute type can have one or more application attribute types associated to it.
  Each dimension attribute type can have one or more values belonging to it.

Attribute Values: Attribute values are values taken on by a dimension attribute type variable:
  The attribute values can be a literal, a list of values, or a predefined range of values, or a more complex grouping of values.
  The list of values against each attribute can be partitioned into its own table (e.g. corresponding to a dictionary schema definition).

Segments: Segments provide a mechanism for defining an attribute value that encompasses a range or set (e.g. age=[40-45]).
  A targeting dimension dictionary can contain a master list of segments for lookup, together with the values that describe the segment.
  In some embodiments, the list of segments could be further partitioned by the owner of the segment.

Such a relationship between data items comprising a targeting dimension dictionary makes the dictionary scalable and extensible to new attribute type declarations and the number of values against each attribute type.

Predicate Configuration Using a Targeting Dimension Dictionary

A predicate configuration is formed by amalgamating a group of predicates (see FIG. 1B). Each predicate in the group can define an aspect of targeting. A given predicate can comprise a targeting dimension, an attribute type, and attribute values (possibly including a segment). A predicate configuration can be associated with a high-level business object where targeting has to be applied (not shown). Predicate configurations can be shared across different business objects depending upon the requirements.

The generic targeting framework can be re-used by any application that requires it by following simple rules.

User-described Targeting Dimensions in a Targeting Dimension Dictionary

Figure 5:
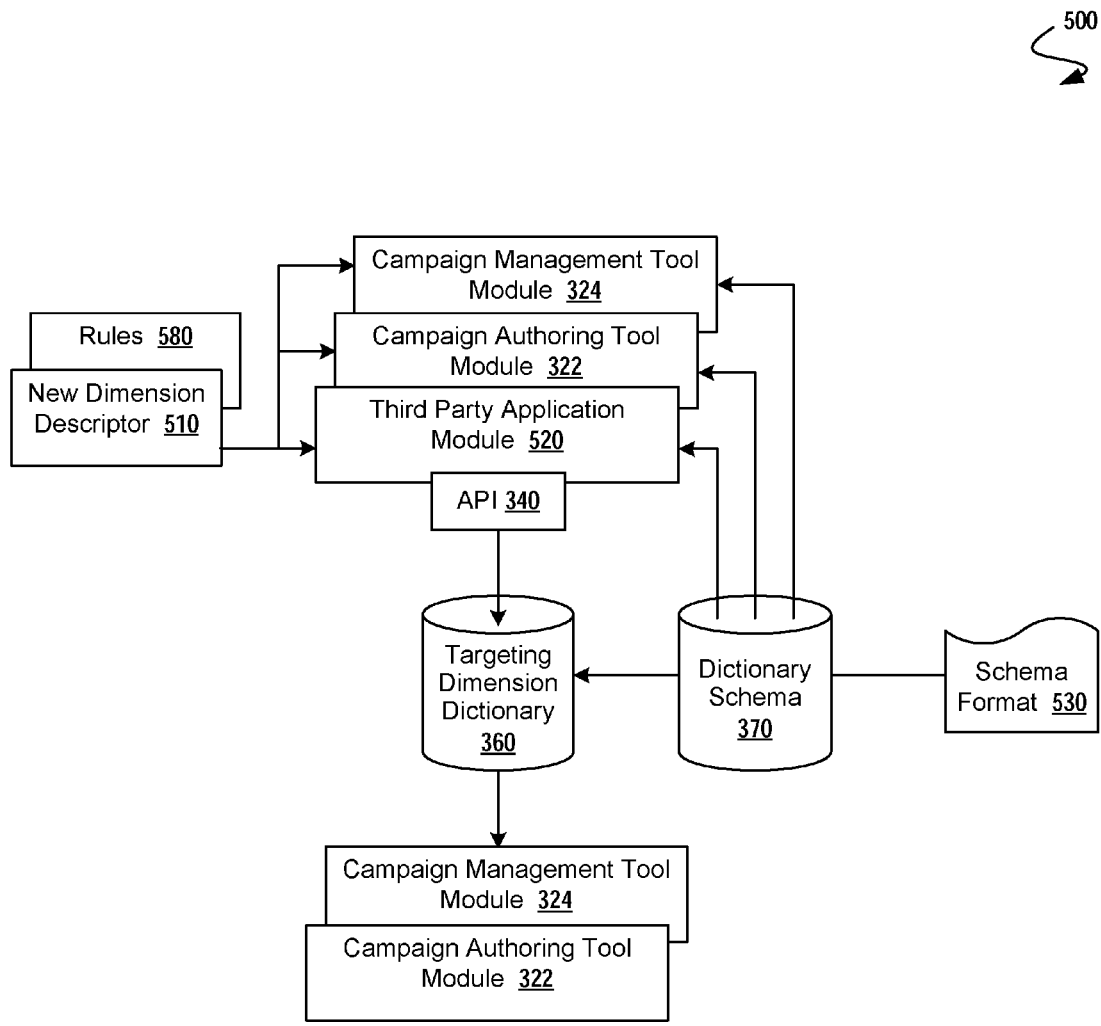
FIG. 5 is a depiction of data flow and relationships between components interfacing with a targeting dimension dictionary, according to one embodiment.

FIG. 5 depicts data flow and relationships between components interfacing with a targeting dimension dictionary. As shown, a targeting dimension dictionary 360 receives inputs from a dictionary schema 370 and applications (e.g. a campaign authoring tool module 322, a campaign management tool module 324, a third-party application module 520). The applications and the targeting dimension dictionary 360 share access to a dictionary schema 370, which dictionary schema 370 in turn accesses a schema format 530. A schema format can be, for example, a ".DTD" file, or an ".XSD" file, or an Oracle schema file, etc.

In usage, an advertising network user (e.g. an advertising agency, a publisher, an advertiser, etc) can use any of the depicted applications in order to read in a new dimension descriptor 510, and follow application guidelines or rules 580 for defining a new dimension. Also, and as shown in FIG. 3, an index construction module 316 can execute to incorporate into an index any contracts that comprise the new dimension descriptor 510. Construction of an index having characteristics for scalability, fast construction, and fast retrieval are detailed in a commonly-owned patent application.

Thus, it can now be understood that a system for booking an advertisement to an impression using a targeting dimension dictionary can comprise a targeting dimension dictionary that includes user-described targeting dimensions. The data relationships between a targeting dimension, a dimension attribute type, and an application attribute type can be described schematically.

A further description of the targeting dimension dictionary and uses now follow.

Formalization of Targeting Taxonomy in a Targeting Dimension Dictionary

Figure 6A:
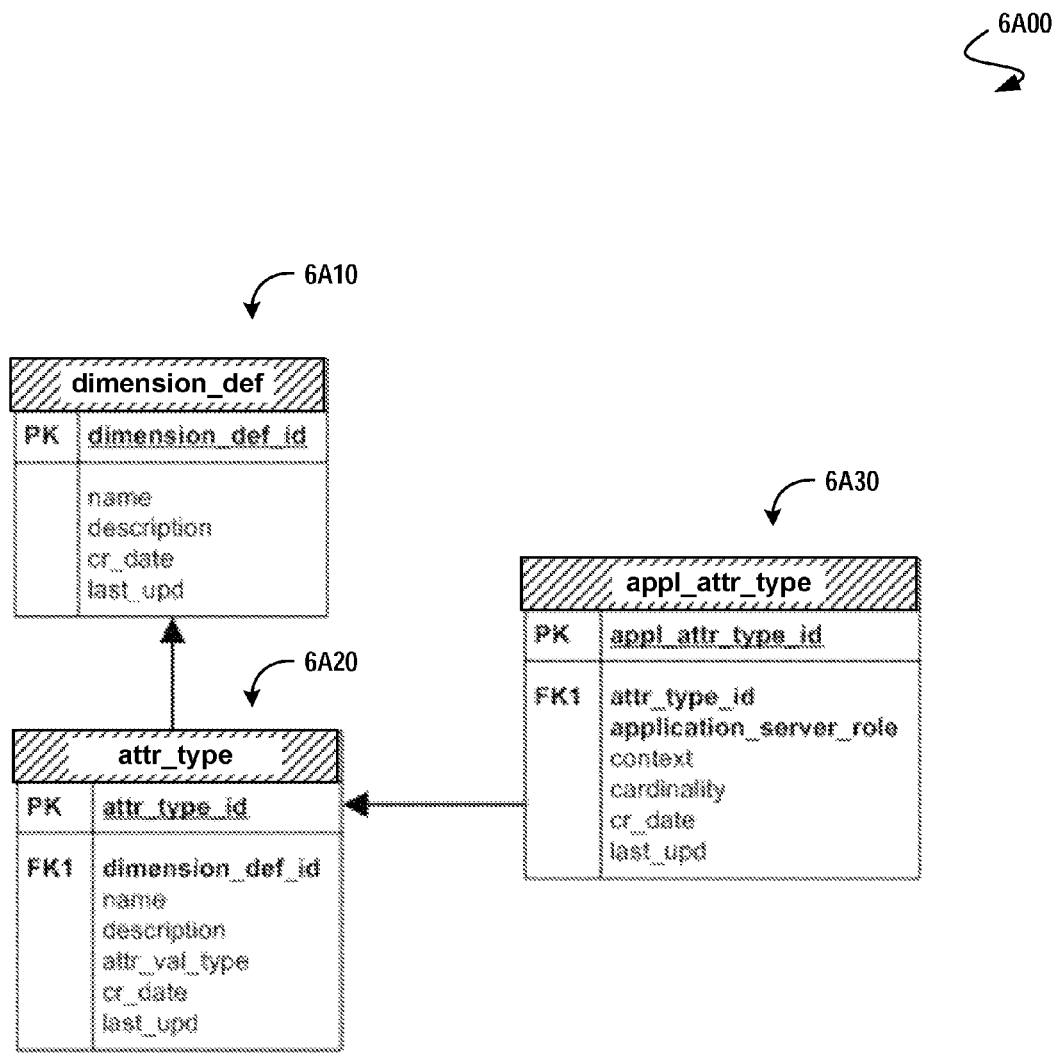
FIG. 6A is a depiction of an exemplary targeting dimension dictionary schema presented as data objects, according to one embodiment.

FIG. 6A depicts an exemplary targeting dimension dictionary schema presented as data objects. As shown, the targeting dimension dictionary schema 6A00 shows data objects used by a targeting dimension dictionary so as to allow the available targeting dimensions and dimension attribute types to be retrieved (e.g. via a call through an application program interface 340) from a target dimension dictionary.

The targeting dimension object 6A10 represents a computer readable object used for storing aspects of a targeting dimension. Targeting dimensions are used to group and categorize the attributes. Exemplary targeting dimensions include "DEMO" (i.e. demographic), "GEO" (i.e. geographic), "BT" (i.e. behavioral targeting), etc.

The dimension attribute type object 6A20 represents a computer readable object used for storing aspects of a dimension attribute type. Dimension attribute types define the attributes for the targeting dimension. Exemplary dimension attribute types include "state", "age", "gender", etc.

The application attribute type object 6A30 represents a computer readable object used for storing aspects of a dimension application attribute type. An application attribute type object defines which applications (and in some cases, which specific parts of the application) use which application attribute types and which dimension attribute types. In some embodiments, an application (e.g. a third party application module 520) might use only audience-centric targeting dimensions (e.g. "DEMO", "GEO"). Or, in some embodiments, an application (e.g. a third party application module 520) might use only publisher-specific targeting dimensions. In an exemplary embodiment, a table enumerates several targeting dimensions. Table 1 is such an example.

TABLE 1

Targeting Dimensions

| Dimension_id | Name |
|---|---|
| 1 | Geo |
| 2 | demographic |
| 3 | psycho_graphics |
| 4 | techno_graphics |
| 5 | temporal |

In another exemplary embodiment, a table enumerates attribute types by name and attribute type identifier. Table 2 is such an example.

TABLE 2

| attr_type_id | Dimension_id | Name |
|---|---|---|
| 1 | 1 | location_id |
| 2 | 2 | gender |
| 3 | 2 | age_group |
| 4 | 2 | education |
| 5 | 2 | ethnicity |
| 6 | 2 | house_hold_income |
| 7 | 2 | occupation |
| 8 | 2 | marital_status |
| 9 | 2 | religion |
| 10 | 1 | home_location_id |
| 11 | 6 | country |
| 12 | 6 | language |
| 11 | 6 | country |
| 12 | 3 | category |
| 13 | 3 | rule |
| 14 | 3 | intensity |
| 15 | 3 | life_stage |
| 16 | 3 | new_user |
| 17 | 3 | recency |
| 18 | 3 | re-targeting |
| 19 | 4 | bandwidth |
| 20 | 4 | device_type |
| 21 | 4 | ISP |
| 22 | 4 | operating_system |
| 23 | 5 | seasonality |
| 24 | 5 | time of day |

Figure 6B:
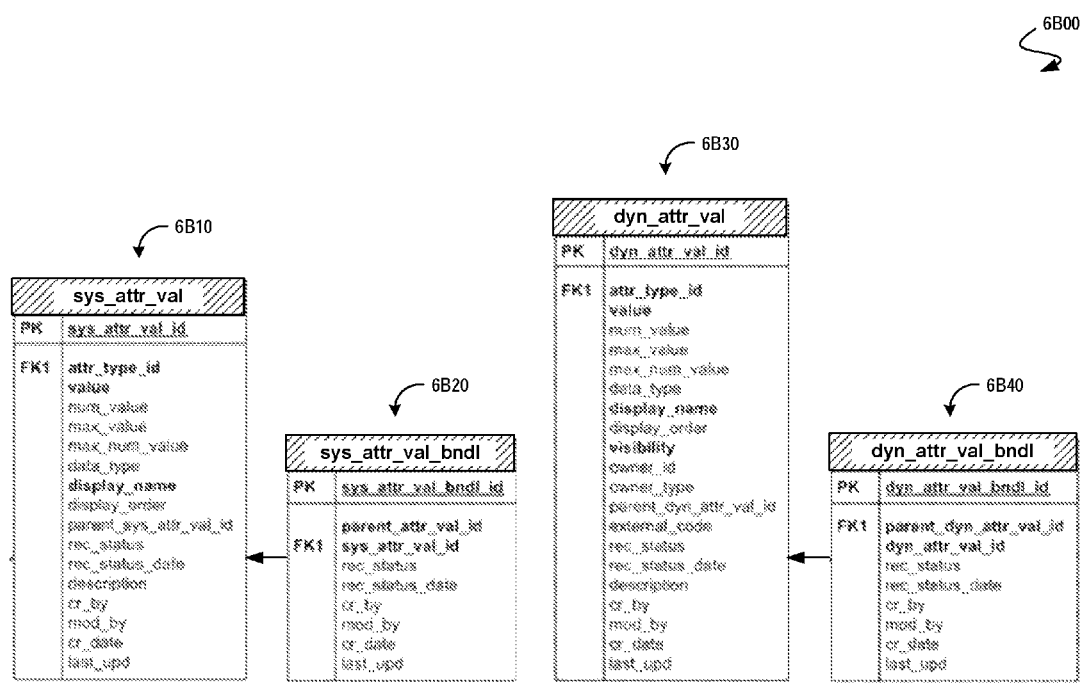
FIG. 6B depicts an exemplary dimension attribute value schema presented as data objects, according to one embodiment.

FIG. 6B depicts an exemplary dimension attribute value schema presented as data objects. As shown, the dimension attribute value schema 6B00 shows data objects used for a targeting dimension dictionary to allow the targeting dimensions, dimension attribute types, dimension attribute values, and dimension attributes to be retrieved (e.g. via an application program interface call). The dimension attribute value object represents a computer readable object used for storing aspects of dimension attribute values. Some embodiments include at least one system dimension attribute value object 6B10 and at least one dynamic dimension attribute value object 6B30. Similarly, some embodiments include at least one system dimension attribute bundle object 6B20 and at least one dynamic dimension attribute bundle object 6B40.

As earlier mentioned, a dimension attribute value may take on values formed by complex data types. A dimension attribute value formed by a complex data type is termed a segment. A dimension attribute type (such as "age") can take on a discrete value (such as "20"). As another example, a dimension attribute type (such as "interest") could take on a value of "Red Cars". Some dimension attribute types can have only a specific set of segments defined. For example, the dimension attribute type "gender" can be defined to only take on values "M" or "F" (i.e. corresponding to "male" or "female", respectively). Other dimension attribute types can take on an infinite number of segments. For example, a series of segments for "age" could be defined as ranges such as age=[20 years-35 years], age=[20 years-21 years], age=[20.5 years-21.5 years] etc.

Target Segments

A system dimension attribute value object 6B10 and a dynamic dimension attribute value object 6B30 can hold the data that is available for selection, and such data that is available for selection can be presented as a list. This list could be considered to be a 'standard list' or could be considered to be a 'custom list'. A custom list can specify aspects of visibility control; that is, a custom list can specify what entities can see and use the data in the custom list. In this manner, segments could be owned and managed (e.g. with limited visibility) by a particular entity on the exchange (e.g. a network, advertiser, or publisher). Lists without visibility restrictions can be used as exchange-wide segments that can be used by any network, advertiser or publisher (e.g. via an application program interface) to configure targeting.

Returning to the discussion of segment types, and recalling that a dimension attribute value formed by a complex data type is termed a segment, various segment types can be provided. Table 3 lists exemplary segment types and corresponding descriptions.

TABLE 3

| Segment Type | Value | Description |
|---|---|---|
| literal | 1 | literal values (e.g. "male", "female", "adult", "pg13") |
| numeric | 2 | numeric values |
| range | 3 | defines segment as a range of values. "between" operations could be performed in the ranges |
| group | 4 | defines arbitrary grouping of different segments; specific segments of the group are defined schematically in additional tables |

Predicate Configuration

Defining a target can involve defining any number of predicates (see FIG. 1B), a combination of which predicates can define a predicate configuration 1B30 which could also be used as a template. The predicate configuration can be associated to an object in the system that can change behavior during serving.

Figure 6C:
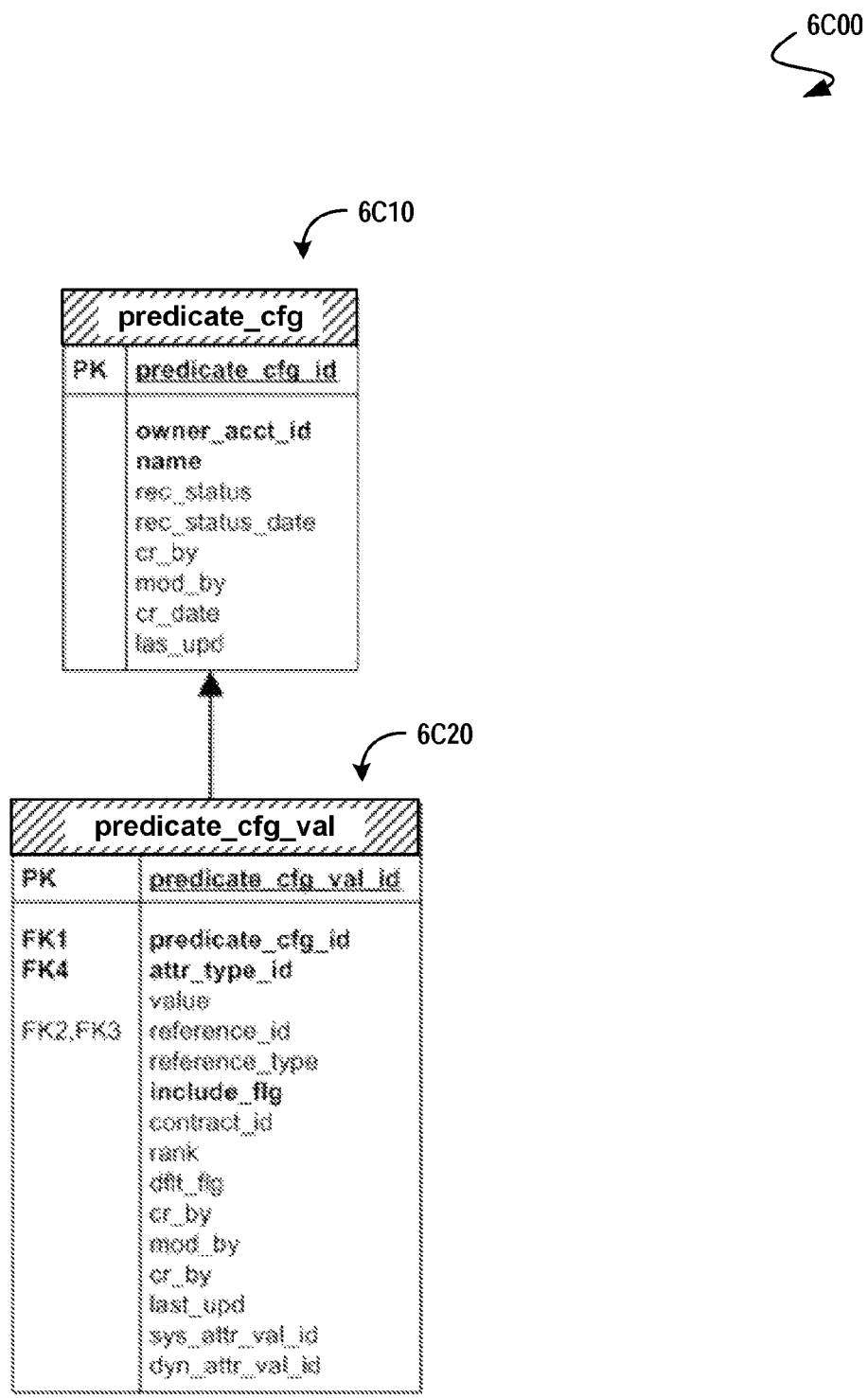
FIG. 6C is a depiction of exemplary predicate configuration objects, according to one embodiment.

FIG. 6C depicts exemplary predicate configuration objects. As shown, the predicate configuration objects 6C00 shows data objects used, to allow the targeting dimensions, predicate configuration objects, and targeting predicates to be retrieved (e.g. via an application program interface call) from a targeting dimension dictionary. A predicate configuration object takes on one or more predicate configuration values, including subsuming a target predicate 1B40, or a plurality of target predicates. The predicate configuration objects 6C00 represents a computer-readable object used for storing aspects of a predicate configuration and for storing predicate configuration values. Some embodiments include at least one predicate configuration object 6C10 and at least one predicate configuration value object 6C20.

In various embodiments, using predicate configuration objects 6C00, a predicate configuration manager module 317 can be used to associate one or more predicate configurations objects to one or more predicate configurations value objects within an advertising server network 300.

Thus, it can be seen that a predicate configuration object 6C10 subsumes a predicate configuration value object 6C20 (or multiple instances of a predicate configuration value object 6C20). The predicate configuration object can be used by tools in the course of executing operations for retrieving advertisements matching an impression using a target predicate where the target predicate is constructed at least in part using the targeting dimension dictionary. In some cases, such tools (e.g. a campaign authoring tool module, a campaign management tool module) can use a screen device.

Figure 7:
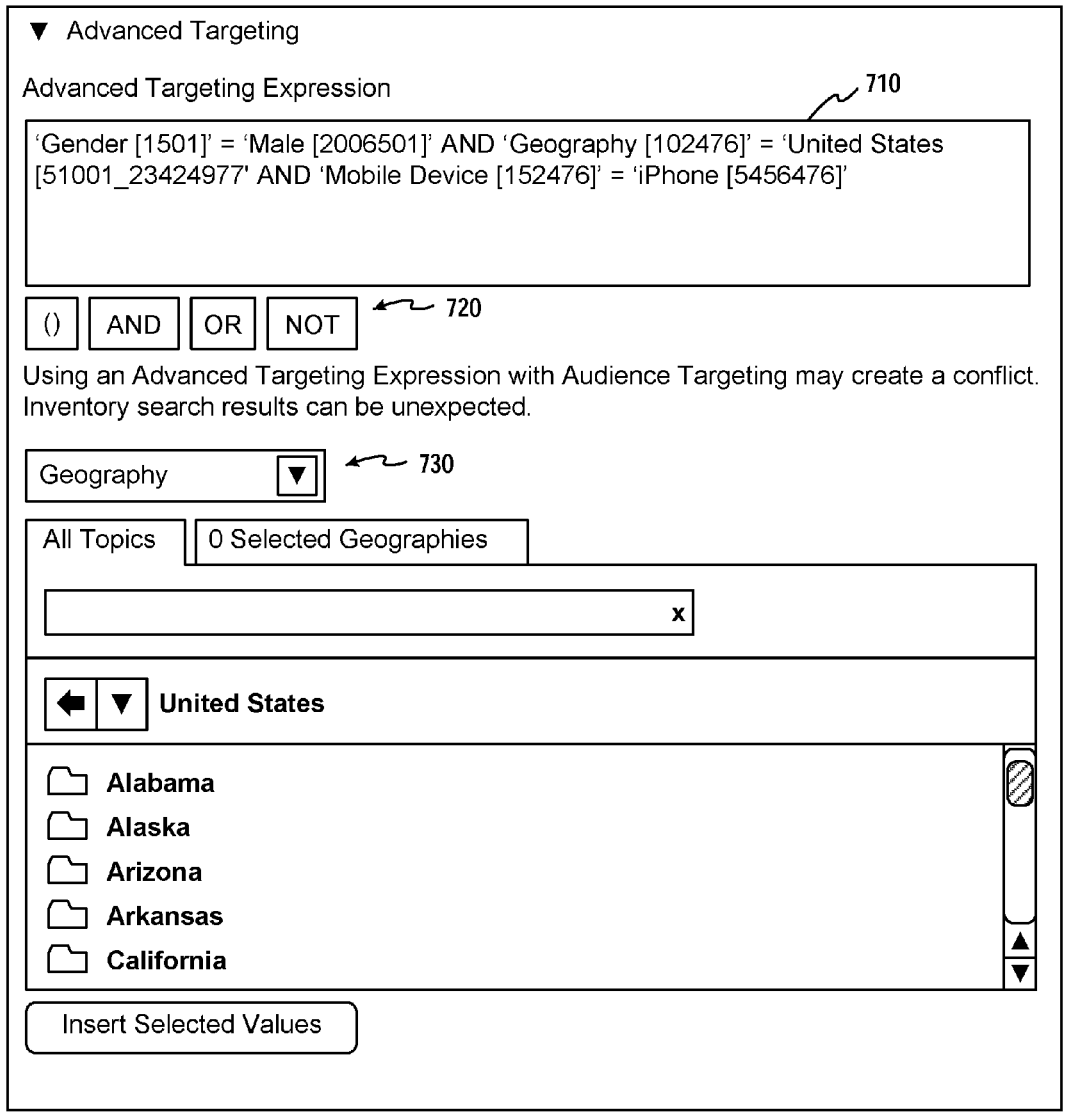
FIG. 7 is a depiction of a screen device for use by a campaign application to configure targeting, according to one embodiment.

FIG. 7 depicts a screen device 700 for use by a campaign application. As shown a predicate and/or a predicate configuration can be defined using a text entry box 710, possibly in conjunction with predicate logical operator buttons 720 in order to construct an advanced targeting expression (e.g. a predicate configuration 1B30). The screen device 700 may include a pulldown menu 730 from which values in the pulldown are populated using one or more aspects provided by instances of objects conforming to the targeting dimension dictionary schema 6A00.

Figure 8:
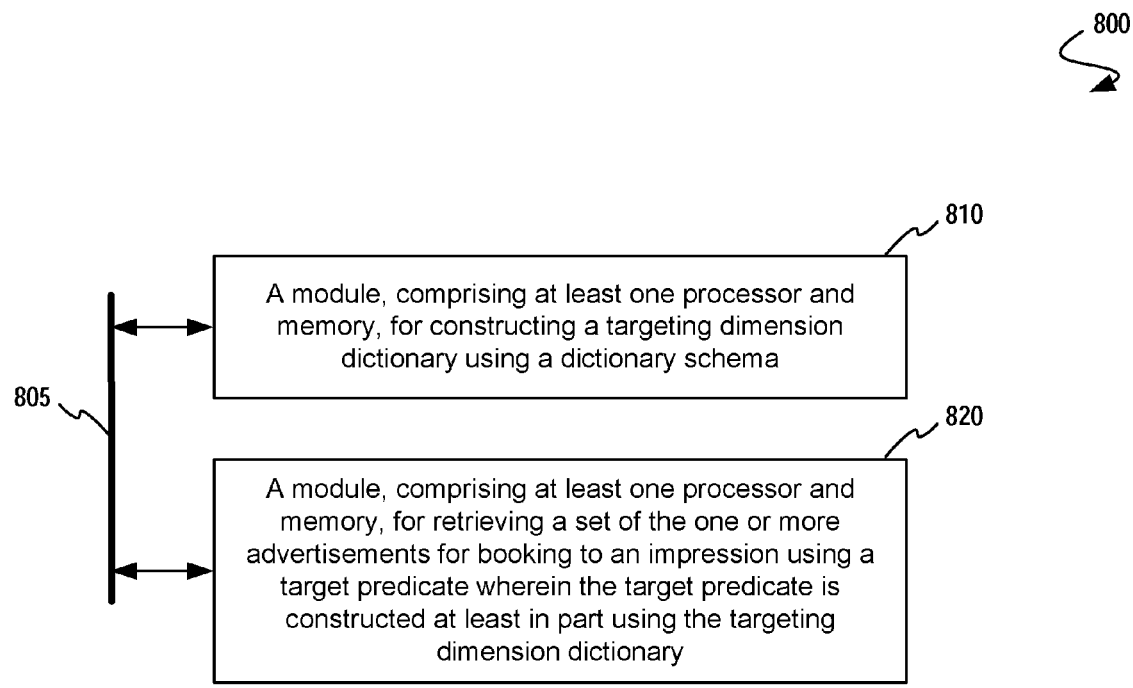
FIG. 8 is a depiction of a system for booking an advertisement to an impression using a targeting dimension dictionary, according to one embodiment.

FIG. 8 depicts a block diagram of a system for booking one or more advertisements to an impression using a targeting dimension dictionary. As an option, the present system 800 may be implemented in the context of the architecture and functionality of the embodiments described herein. Of course, however, the system 800 or any operation therein may be carried out in any desired environment. As shown, system 800 comprises a plurality of modules, a module comprising at least one processor and a memory, each connected to a communication link 805, and any module can communicate with other modules over communication link 805. The modules of the system can, individually or in combination, perform method steps within system 800. Any method steps performed within system 800 may be performed in any order unless as may be specified in the claims. As shown, system 800 implements a method for booking one or more advertisements to an impression using a targeting dimension dictionary, the system 800 includes modules for: constructing, in memory, the targeting dimension dictionary using a targeting dimension dictionary schema, the targeting dimension dictionary schema comprising at least one of, a targeting dimension object, a dimension attribute type object, an application attribute type object (see module 810); and retrieving, in a computer, the targeting dimension dictionary for booking the one or more advertisements to the impression using a target predicate wherein the target predicate is constructed at least in part using the targeting dimension dictionary (see module 820).

Figure 9:
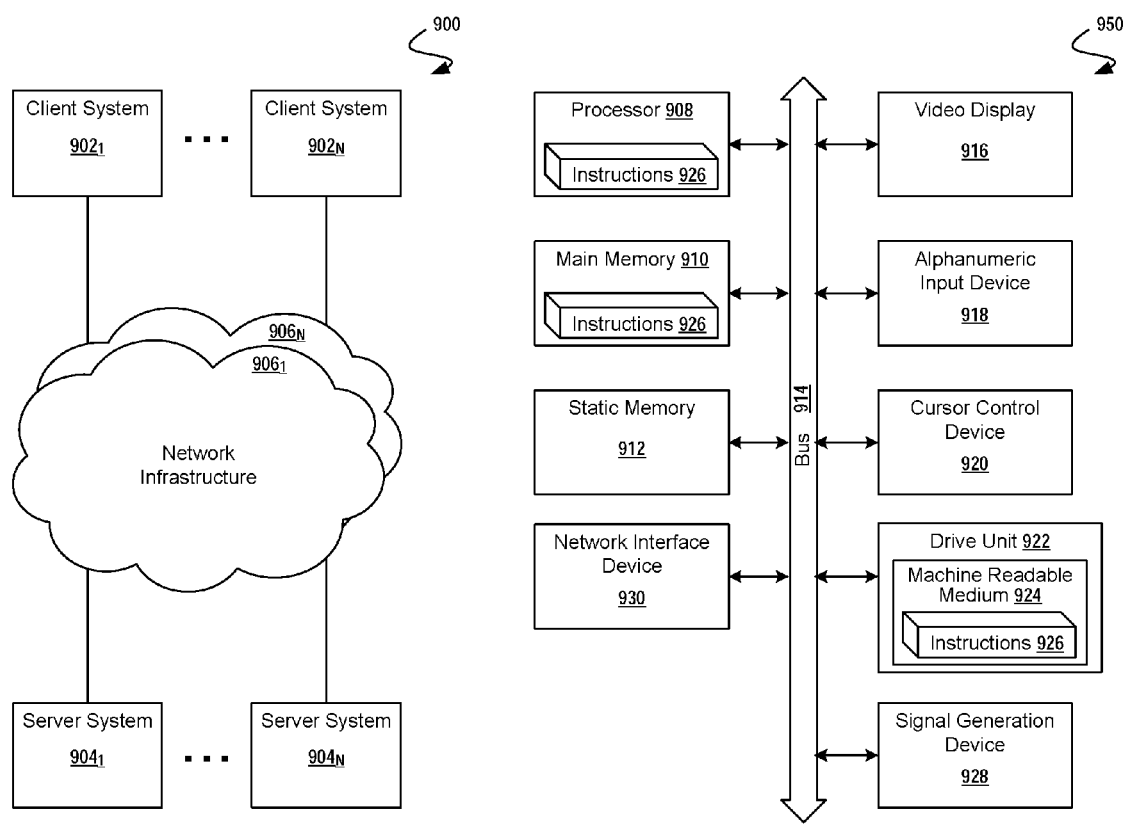
FIG. 9 is a diagrammatic representation of a network including nodes for client computer systems, nodes for server computer systems, and nodes for network infrastructure, according to one embodiment.

FIG. 9 is a diagrammatic representation of a network 900, including nodes for client computer systems $902_1$ through $902_N$, nodes for server computer systems $904_1$ through $904_N$, and nodes for network infrastructure $906_1$ through $906_N$, any of which nodes may comprise a machine (e.g. computer 950) within which a set of instructions for causing the machine to perform any one of the techniques discussed above may be executed. The embodiment shown is purely exemplary, and might be implemented in the context of one or more of the figures herein.

Any node of the network 900 may comprise a general-purpose processor, a digital signal processor (DSP), an application specific integrated circuit (ASIC), a field programmable gate array (FPGA) or other programmable logic device, a discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems (including a processor and memory), a massively parallel computer system, and/or a cloud computer system.

The computer system (e.g. computer 950) includes a processor 908 (e.g. a processor core, a microprocessor, a computing device, etc), a main memory (e.g. computer memory 910), and a static memory 912, which communicate with each other via a bus 914. The computer 950 may further include a display unit (e.g. computer display 916) that may comprise a touch-screen, or a liquid crystal display (LCD), or a light emitting diode (LED) display, or a cathode ray tube (CRT). As shown, the computer system also includes a human input/output (I/O) device 918 (e.g. a keyboard, an alphanumeric keypad, etc), a pointing device 920 (e.g. a mouse, a touch screen, etc), a drive unit 922 (e.g. a disk drive unit, a CD/DVD drive, a tangible computer readable removable media drive, an SSD storage device, etc), a signal generation device 928 (e.g. a speaker, an audio output, etc), and a network interface device 930 (e.g. an Ethernet interface, a wired network interface, a wireless network interface, a propagated signal interface, etc). The drive unit 922 includes a machine-readable medium 924 on which is stored a set of instructions (i.e. software, firmware, middleware, etc) 926 embodying any one, or all, of the methodologies described above. The set of instructions 926 is also shown to reside, completely or at least partially, within the main memory and/or within the processor 908. The set of instructions 926 may further be transmitted or received via the network interface device 930 over the network bus 914.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing non-transitory information in a form readable by a machine (e.g. a computer). For example, a machine-readable medium includes read-only memory (ROM); random access memory (RAM); magnetic disk storage media; optical storage media; flash memory devices; and electrical, optical or acoustical or any other type of media suitable for storing non-transitory information.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method, comprising:
    through an application program interface, receiving from an advertiser input data defining an advertising campaign of the advertiser, the advertising campaign including one or more contracts, each respective contract defining one or more advertising placements, each respective advertising placement being associated with one or more predicate configurations;
    using the input data defining the advertising campaign, constructing, by an index construction module, in electronic memory, a targeting dimension dictionary that is user extensible to new attribute type declarations, the targeting dimension dictionary comprising at least three targeting dimensions including a dimension of web pages, each targeting dimension comprising at least two attribute types, each attribute type comprising one or more attribute values to make the targeting dimension dictionary scalable and extensible to newly added attribute type declarations and number of values against each attribute type, and the targeting dimension dictionary comprising a history of hits associated with the attribute values;
    receiving from a user advertiser input data defining a new targeting dimension, a new dimension attribute type or a new dimension attribute value corresponding to new targeting criteria introduced by the user;
    dynamically updating the targeting dimension dictionary, using the index construction module, by adding at least one of the new targeting dimension, the new dimension attribute type, or the new dimension attribute value based on the advertiser input data provided by the user, without modifying the application programming interface, the one or more contracts including one or more newly added attribute type declarations or number of values against each attribute type;
    generating, using a campaign authoring tool and based on clauses of a contract, a target predicate for the contract, at least in part using the updated targeting dimension dictionary, wherein the target predicate for the contract is amalgamated with one or more other target predicates of a predicate configuration of the one or more predicate configurations;
    determining, by a predicate configuration manager module, whether the target predicate for the contract covers a target market based on the history of hits associated with the attribute values;
    adjusting, by the predicate configuration manager module, the target predicate when the target predicate for the contract does not cover a target market;
    identifying an impression available for booking at a web page of the web pages;
    generating, by the predicate configuration manager module, a placement opportunity profile predicate for the impression, at least in part using the targeting dimension dictionary, the placement opportunity profile predicate being generated based on dimension attributes of the history of hits for the web page;
    determining whether the target predicate matches the placement opportunity profile predicate;
    responsive to the target predicate being matched to the placement opportunity profile predicate, booking, in the electronic memory, an advertisement associated with the contract to the impression associated with the placement opportunity profile predicate, and
    serving the advertisement associated with the contract to the impression to a client system over a network.

2. The method of claim 1, further comprising providing the targeting dimension dictionary with an application programming interface, wherein the application programming interface allows the targeting dimension dictionary to be accessed by multiple applications.

3. The method of claim 2, wherein the targeting dimension dictionary employs the application programming interface.

4. The method of claim 2, wherein the campaign authoring tool interfaces with the targeting dimension dictionary through the application programming interface.

5. The method of claim 4, wherein the campaign authoring tool is configured to create criteria dynamically, choose from predetermined criteria, or both.

6. The method of claim 5, wherein the created criteria employs a text-entry box on a screen device.

7. The method of claim 1, wherein the targeting dimension dictionary comprises a dimension of time periods.

8. The method of claim 7, wherein the placement opportunity profile predicate is generated based on dimension attributes of the history of hits for a certain time period in the dimension of time periods.

9. A non-transitory computer readable medium comprising a set of instructions which, when executed by a computer, is configured to:
    receive, through an application program interface, from an advertiser, input data defining an advertising campaign of the advertiser, the advertising campaign including one or more contracts, each respective contract defining one or more advertising placements, each respective advertising placement being associated with one or more predicate configurations;
    using the input data defining the advertising campaign, construct, by an index construction module, in memory, a targeting dimension dictionary that is user extensible to new attribute type declarations, the targeting dimension dictionary comprising at least three targeting dimensions including a dimension of web pages a history of hits associated with each of the web pages, each targeting dimension comprising at least two attribute types, each attribute type comprising one or more attribute values to make the targeting dimension dictionary scalable and extensible to newly added attribute type declarations and number of values against each attribute type;
    receive, from a user, advertiser input data defining a new targeting dimension, a new dimension attribute type or a new dimension attribute value corresponding to new targeting criteria introduced by the user;
    access the targeting dimension dictionary;
    dynamically update, by the index construction module, the targeting dimension dictionary, using an index construction module, by adding at least one of the new targeting dimension, the new dimension attribute type, or the new dimension attribute value based on the advertiser input data provided by the user without modifying the application programming interface, the one or more contracts including one or more newly added attribute type declarations or number of values against each attribute type;
    receive, by a campaign authoring tool, a contract of an advertiser;

construct, based on clauses of the contract, a target predicate for the contract, at least in part using the updated targeting dimension dictionary;

determine, by a predicate configuration manager module, whether the target predicate for the contract covers a target market based on the history of hits associated with the attribute values;

adjust, by the predicate configuration manager module, the target predicate when the target predicate for the contract does not cover a target market;

identify an impression available for booking at a web page of the web pages;

construct, by the predicate configuration manager module, a placement opportunity profile predicate for impression at least in part using the targeting dimension dictionary, the placement opportunity profile predicate being constructed based on impression attributes of the history of hits for the web page;

determine whether the target predicate matches the placement opportunity profile predicate;

responsive to the target predicate being matched to the placement opportunity profile predicate, book an advertisement associated with the contract to the impression associated with the placement opportunity profile predicate; and serve the advertisement associated with the contract to the impression to a client system over a network.

10. The non-transitory computer readable medium of claim 9, wherein the set of instructions is further configured to provide the targeting dimension dictionary with an application programming interface, wherein the application programming interface allows the targeting dimension dictionary to be accessed by multiple applications.

11. The non-transitory computer readable medium of claim 10, wherein the adding to the targeting dimension dictionary employs the application programming interface.

12. The non-transitory computer readable medium of claim 10, wherein the campaign authoring tool interfaces with the targeting dimension dictionary through the application programming interface.

13. The non-transitory computer readable medium of claim 12, wherein the campaign authoring tool is configured to create criteria dynamically, choose from predetermined criteria, or both.

14. The non-transitory computer readable medium of claim 13, wherein the created criteria dynamically employs a text-entry box on a screen device.

* * * * *